United States Patent [19]

Brooks

[11] Patent Number: 4,583,299
[45] Date of Patent: Apr. 22, 1986

[54] FLUIDIZATION AID FOR COHESIVE MATERIALS

[75] Inventor: Edward F. Brooks, Hermosa Beach, Calif.

[73] Assignee: TRW Inc., Redondo Beach, Calif.

[21] Appl. No.: 696,670

[22] Filed: Jan. 30, 1985

Related U.S. Application Data

[63] Continuation-in-part of Ser. No. 684,424, Dec. 20, 1984, which is a continuation-in-part of Ser. No. 620,996, Jun. 15, 1984, which is a continuation-in-part of Ser. No. 339,778, Jan. 15, 1982, abandoned, which is a continuation of Ser. No. 188,201, Sep. 18, 1980, abandoned.

[51] Int. Cl.$^4$ .................... F26B 3/08; F27B 15/00; C10G 35/00; B01J 23/00
[52] U.S. Cl. ........................... 34/10; 208/163; 432/15; 502/182; 502/185
[58] Field of Search ............. 432/15; 34/10; 208/163; 502/182, 185, 412, 413, 415, 416

[56] References Cited

U.S. PATENT DOCUMENTS

| | | |
|---|---|---|
| 2,581,118 | 1/1952 | Main . |
| 2,824,074 | 2/1958 | Sieg ................................. 502/182 |
| 3,816,609 | 6/1974 | Hamner ............................ 502/185 |
| 4,225,531 | 9/1980 | Jones et al. . |

OTHER PUBLICATIONS

Cab-o-Sil Properties and Functions, Cabot Corporation, 9/83.
"Cab-o-Sil ® Coatings", Cabot Corporation.

Primary Examiner—John J. Camby
Attorney, Agent, or Firm—John T. Wiedemann; Jeffrey G. Sheldon

[57] ABSTRACT

Tendrillar carbonaceous material is used as a fluidization aid for fluidizing cohesive materials in fluidized beds. The tendrillar carbonaceous material can be a fibrous, particulate carbonaceous material comprising carbon fibers and a ferrous group metal component dispersed throughout the carbon fibers as nodules. The tendrillar carbonaceous material has a bulk density of from about 0.04 to about 0.7 g/cm$^3$ and comprises an agglomeration of tendrils having a diameter of from about 0.01 to about 1 micron and a length to diameter ratio of from about 5:1 to about 1000:1.

17 Claims, 3 Drawing Figures

FLUIDIZATION AID FOR COHESIVE MATERIALS

CROSS-REFERENCES

This application is a continuation-in-part of application Ser. No. 684,424 filed on Dec. 20, 1984, entitled "Fluidization Aid", which is a continuation-in-part of application Ser. No. 620,996 filed on June 15, 1984 entitled "Method for Making Carbonaceous Materials", which is a continuation-in-part of application Ser. No. 339,778 filed on Jan. 15, 1982 now abandoned, which is a continuation of application Ser. No. 188,201 filed on Sept. 18, 1980, now abandoned. These five applications are incorporated herein by this reference.

BACKGROUND

This invention relates to techniques for fluidizing solids which heretofore could not be fluidized in a fluidized bed.

Fluidization of solids in a fluidized bed is a much used method of gas-solids contacting with many commercially successful applications in widespread fields. Fluidized beds find use in chemical reactors such as fluidized-bed catalytic crackers. Other chemical processes utilizing fluidized beds include processes for chlorination of hydrocarbons, oxidation of gaseous fuels, roasting of ore to facilitate release of valuable metals, calcination of lime in dolomite, and calcination of phosphate rock.

Fluidized beds are also used for physical contacting processes, such as for heat transfer, solids mixing, drying, size enlargement, size reduction, classification, adsorption, desorption, heat treatment, and coating. Exemplary of these processes are drying coal, cement, rock, and limestone, as well as coating metal parts with thermoplastic resins where a heated metal part is dipped into a fluidized bed of the thermoplastic resin.

An advantageous feature of fluidized beds is that fluidized beds tend to have nearly uniform temperatures and good heat transfer, both from gas to solids and from solids to internal surfaces. Further advantages are that addition or loss of solids through chemical or other means can normally be tolerated, and that rather thorough solids mixing occurs.

There are also, however, features of fluidized beds which are generally disadvantageous, and most of the disadvantages are due to bubbles. Bubbles provide a mechanism for gas bypassing, which can result in process inefficiency. The motion of the bubbles also promotes elutriation of fine particles, fragmentation of friable solids, and erosion of reactor surfaces.

Another problem experienced with fluidized beds is entrainment. As the fluidization velocity in a fluidized bed increases, entrainment of solid particles from the bed also increases, resulting in loss of material from the vessel containing the bed. This in turn increases operational costs to supply makeup material and/or to provide equipment to return entrained material to the bed.

Advantages and disadvantages of fluidized beds are most easily presented in terms of the powder classification technique described in Geldart, "Types of Gas Fluidization", *Powder Technology*, 7 (1973) 285-292. Geldart divides solid particles into groups, based on particle density and particle size, as shown in FIG. 1.

Group A materials have a small mean particle size, typically 30 to 100 microns. Most commercial fluidized catalytic operations, such as catalytic cracking, are performed with materials of this size. Beds of group A material tend to bubble freely. Moderate bed expansions in the range of about 20 to about 50% can be attained. Bubbles tend to split and recoalesce frequently. Beds of group A materials noticeably expand before bubbling commences.

Group B materials include materials having a mean particle size ranging from about 100 to about 500 microns and a particle density of from about 1.4 to about 4 g/cm$^3$. Sand is a typical group B powder. Fluidized coal combustion is an example of the use of group B material. When a group B material is fluidized, bubbles tend to be larger and more distinct than in group A materials, and there is no known limit to bubble size. Bed expansion commences with the onset of bubbling.

Group C materials are those which are in any way cohesive and generally can be fluidized only poorly or not at all. They are also known as cohesive powders. Gas tends to pass through the bed in the form of channels, resulting in poor gas/solid contact and little solids motion.

Group D material are large and/or very dense. A typical application for these very coarse materials is grain drying. Fluidization of group D materials is often performed in a spouted bed which uses a special gas distribution technique.

Thus, in the current state of the art, Group C materials generally cannot be used in fluidizied beds. Therefore there is a need for a technique that will permit good quality fluidization of group C cohesive powders.

SUMMARY

The present invention satisfies this need. According to the present invention, a cohesive material is fluidized in a fluidized bed by using tendrillar carbonaceous material as a fluidization aid. The mass ratio of tendrillar carbonaceous material to particulate solid is from about 1:9 to about 4:1. The cohesive powder has a mean particle size of from about 0.1 to about 120 microns and a density of from 0.1 to 4 g/cm$^3$. The tendrillar carbonaceous material typically has a composition different from the composition of the cohesive material. The tendrillar carbonaceous material has a bulk density of from about 0.04 to about 0.7 g/cm$^3$. The typical mean size of tendrillar carbonaceous material is about 5 to about 50 microns as measured by a micromerograph.

The tendrillar carbonaceous material comprises an agglomeration of tendrils having a diameter of from about 0.01 to about 1 micron, and a length to diameter ratio ranging from about 5:1 to about 1000:1. More typically the tendrils have a diameter of from about 0.1 to about 0.3 micron and a length to diameter ratio of from about 5:1 to about 50:1.

The tendrillar carbonaceous material can be ferrous carbon, which is a fibrous, particulate, carbonaceous material. In ferrous carbon, the tendrils comprise carbon fibers and a ferrous group metal component dispersed throughout the fibers as nodules. These nodules are intimately associated with and at least partially bonded to the carbon fibers. This type of tendrillar carbonaceous material comprises from about 0.1 to about 60% by weight ferrous metal, from about 40 to about 99.9% by weight carbon, and up to about 1.5% by weight hydrogen.

The use of tendrillar carbonaceous material as a fluidization aid allows fluidization of cohesive solids that heretofor could not be effectively fluidized.

DRAWINGS

These and other features, aspects, and advantages of the present invention will become better understood from the following description, appended claims, and accompanying drawings where:

DESCRIPTION

Tendrillar carbonaceous material is used as a fluidization aid. By the term "tendrillar carbonaceous material" is meant carbon-containing material comprising tendrils or slender coiling filaments. Tendrillar carbonaceous material can consist essentially of an agglomeration of tendrils having a diameter of from about 0.01 to about 1 micron, preferably from about 0.1 to about 0.3 micron, and a length to diameter ratio of from about 5:1 to about 1000:1, preferably up to about 50:1. The tendrils are building blocks that form larger agglomerates that are of value in fluidized bed applications. The size of the agglomerates formed is a function of the manufacturing process and of the environment to which the material is subjected.

The amount of agglomeration produced can be measured with commonly used size characterization techniques. One technique uses a micromerograph, which is a device that subjects a material to be measured to high shear forces followed by dispersion in a gas. Size determination is then performed on the dispersed particles using an aerodynamic technique. In a second technique, the material is dispersed in a suitable liquid and subjected to ultrasonic vibration to produce deagglomeration. This technique can be used to prepare samples for scanning electron microscope analysis. Both techniques are essentially deagglomerating techniques which tend to produce a size distribution of the tendrillar carbonaceous material in which the mass mean particle size is many times the diameter of the individual tendrils. Typically, this mass mean particle size for the tendrillar carbonaceous material as measured by such a deagglomerating techniques is in the range of about 5 to about 50 microns.

In a fluidized bed, however, the tendrillar carbonaceous material is subjected to smaller shear forces than in a micromerograph, and is therefore generally present in a concentrated rather than dispersed manner. This leads to the formation of agglomerates of tendrillar carbonaceous material in the fluidized bed. For typical fluidized bed operation, the mass mean particle size of the tendrillar carbonaceous material agglomerates is from about 200 to about 3000 microns. This size range has been determined from direct visual and photographic observation, from bed expansion/particle size correlations, and from entrainment rate/particle size correlations. These large agglomerates can be broken down into smaller particles through deagglomeration techniques such as micromerograph processing. The combination of the properties of the tendrils and the fluidized agglomerate size is believed to be important to provide the beneficial effects of the present invention.

Figure 1:
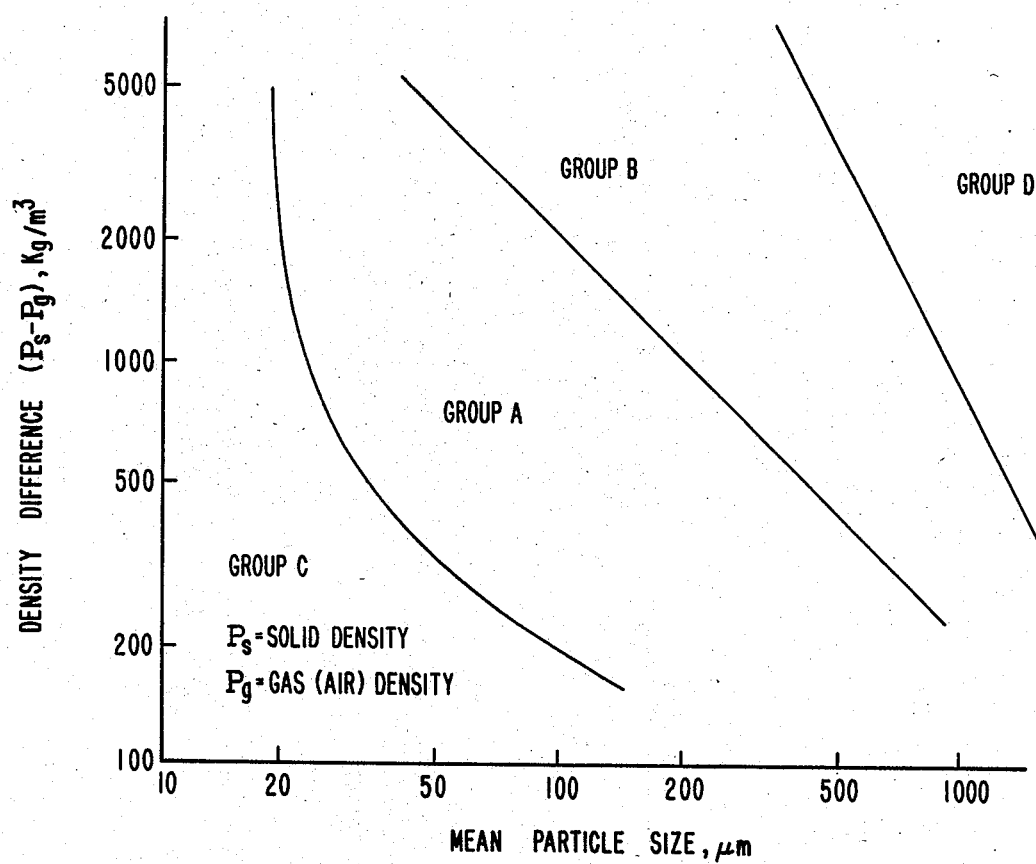
FIG. 1 shows Geldart's material classification diagram.
Figure 2A:
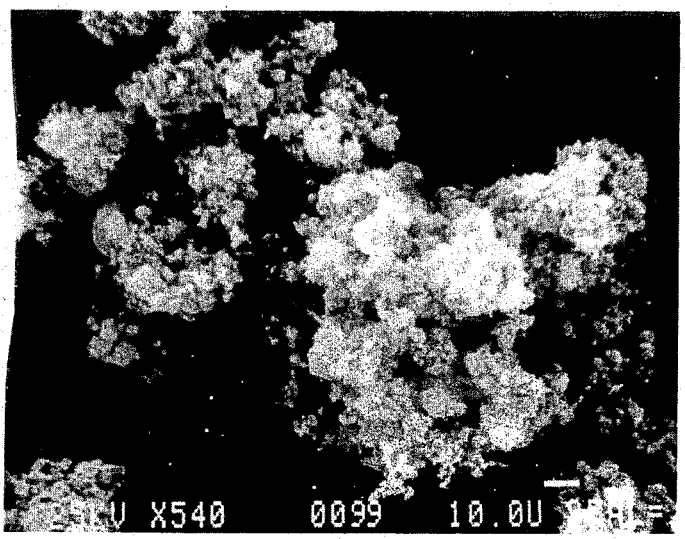
FIGS. 2A and 2B are photomicrographs showing tendrillar carbonaceous material through a scanning electron microscope under relatively low magnification (540x) and under relatively high magnification (20,000x), respectively.
Figure 2B:
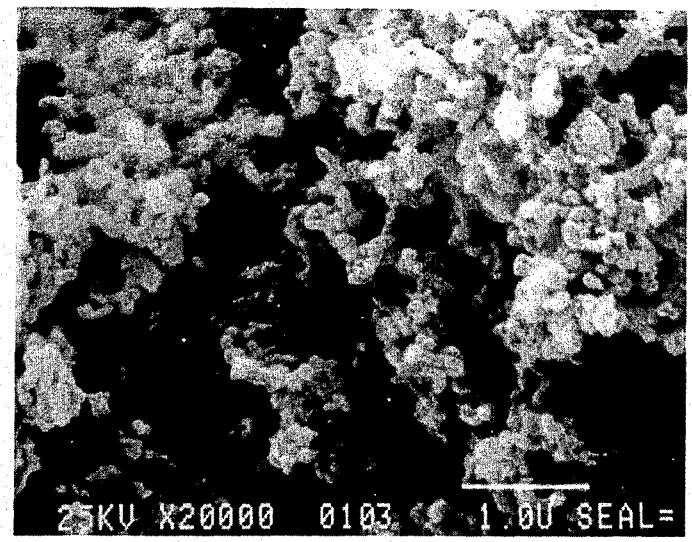

The tendrillar carbonaceous material can be "ferrous carbon" which is a fibrous, particulate, carbonaceous material comprising carbon fibers and a ferrous group metal component. The ferrous group metal component is dispersed throughout the carbon fibers as nodules that are intimately associated with and at least partially bonded to the carbon fibers. The ferrous carbon comprises from about 0.1 to about 60% by weight ferrous metal, from about 40 to about 99.9% by weight carbon, and up to about 1.5% by weight hydrogen. By the term "ferrous metal" there is meant a metal of Group VIII of the Periodic Table of the Elements, such as iron, cobalt, nickel, and combinations, carbides, oxides and alloys thereof. If desired, a portion of the metal can be removed such as by acid treatment. Ferrous carbon material is shown in FIGS. 2A and 2B.

Methods for making the ferrous carbon form of tendrillar carbonaceous material are described in parent application Ser. No. 620,996 filed June 15, 1984 and U.S. patent application Ser. No. 99,789 filed Dec. 3, 1979, which is incorporated herein by this reference. Generally, this form of tendrillar carbonaceous material is made by disproportionating carbon monoxide in the presence of a ferrous group metal component catalyst which can be a metal, an alloy, a carbide or other metallic substance. Carbonaceous material forms and grows from the catalyst surface primarily in the form of fibers. These fibers become tangled masses that occupy increasingly larger volumes in the reactor. Preferably the ferrous carbon is prepared in a fluidized bed containing an abradant and is elutriated overhead as described in the parent application. The ferrous carbon form of tendrillar carbonaceous material produced by these methods includes a major phase and a minor phase, the major phase comprising from about 95 to about 99.9% by weight carbon, from about 0.1% to about 1.5% hydrogen, and the balance, if any, being the ferrous metal. The minor component is the nodules which are dispersed throughout the major phase and are intimately associated with and at least partly bonded to the carbon in the major phase. The minor phase comprises carbon and at least 50% by weight ferrous metal.

Tendrillar carbonaceous material can also be prepared by passing hot hydrocarbons over a ferrous metal catalyst. The ferrous metal content of the tendrillar carbonaceous material produced by these methods can be reduced by acid treatment.

Tendrillar carbonaceous material can be used as a fluidization aid for Geldart group C cohesive powders. Exemplary of such cohesive powders are kieselguhr having a mean particle size of about 15 microns and a bulk density of about 0.22 g/cm$^3$; iron oxide having a mean particle size of about 0.5 microns and a bulk density of about 2.3 g/cm$^3$; and angular alumina having a mean particle size of about 9 microns and a bulk density of about 1.2 g/cm$^3$. Normal fluidization of these powders is extremely difficult; the powder lifts as a plug or channels badly, i.e., the gas passes up voids extending from the fluidizing gas distributor to the bed surface. It is believed that these powders exhibit cohesive behavior because the interparticle forces are greater than those which the fluidizing gas can exert on the particle.

For cohesive powders, the mass ratio of tendrillar carbonaceous material to cohesive powder is preferably from about 1:9 to about 4:1. Generally, the bulk density of tendrillar carbonaceous material is less than that of the cohesive powder, although it can be the same as or greater than the bulk density of the cohesive powder. Generally, the mean particle size of the tendrillar carbonaceous material is greater than the mean particle size of the cohesive powder. Unless indicated otherwise, all particle sizes presented herein are "mass mean particle sizes", and in the case of tendrillar carbonaceous material, are determined with a micromerograph.

Tendrillar carbonaceous material can also be used as a fluidization aid in combination with a particulate solid having a broad size distribution comprising particles in group B, group A, and, if desired, group C. In this case, the fluidized bed forms a non-homogeneous mixture which is rich in larger particulate solids near the bottom and rich in tendrillar carbonaceous material and smaller particulate solid near the top. This configuration can be of benefit when the particulate solid is chemically consumed as part of the process. The tendrillar carbonaceous material improves process efficiency by improving gas/solid contact, and helps reduce entrainment losses of fine particles.

These and other features of the present invention will become better understood with reference to the following examples.

EXAMPLE 1

This example demonstrates the use of tendrillar carbonaceous material as a fluidization aid for a cohesive powder that otherwise could not be fluidized. The powder used was kieselguhr powder. The properties of the powder, properties of the tendrillar carbonaceous material, mass ratio of tendrillar carbonaceous material to kieselguhr powder, gas velocity, and bed expansion percentages are presented in Table 1.

The "bed expansion" of a bed is determined according to the following formula:

Bed expansion = [(H/HO) − 1] × 100% where
Eb = bed expansion, percent
H = bed dynamic height
HO = bed rest height For all examples, ferrous carbon was the type of the tendrillar carbonaceous material. The reported gas velocity in all Examples is the superficial velocity which is gas volumetric flow divided by the bed cross-sectional area. The gas used for this Example, and all of the Examples reported herein, was nitrogen. The vessel used was a transparent unit having a cross-section of 50 cm × 1.6 cm and a height of 180 cm.

At superficial velocities of 12 to 30 cm/s (centimeters per second), the kieselguhr alone did not fluidize at all (Example 1A). The gas flowed through several large, distinct channels and there was virtually no motion of solids. For examples 1B, 1C, and 1D, the kieselguhr was mixed with tendrillar carbonaceous material. The mixing was effected by wet blending the two solids in water, draining off excess water through filter paper, drying the mixture in an oven at about 100 degrees C, and grinding the resulting cake with mortar and pestle. Fluidization quality of the mixtures was excellent and there was no observable bubbling in the bed. The mixtures were easily conveyed through a plastic tube having an inside diameter of 0.64 cm.

TABLE 1

| Example | Particulate Material | | | Tendrillar Carbonaceous Material | | | Gas Velocity (cm/s) | Bed Expansion (%) | Comments |
|---|---|---|---|---|---|---|---|---|---|
| | Type | Mean Size (Microns) | Bulk Density (g/cm³) | Mean Size (Microns) | Bulk Density (g/cm³) | Mass Ratio (C:Particulate) | | | |
| 1A | Kieselguhr | 15 | 0.22 | — | — | 0 | 12–30 | 0 | No fluidization |
| 1B | Kieselguhr | 15 | 0.22 | 15 | 0.22 | 1:1 | 12 | 170 | Excellent fluidization |
| 1C | Kieselguhr | 15 | 0.22 | 15 | 0.22 | 1:1 | 20 | 220 | Excellent fluidization |
| 1D | Kieselguhr | 15 | 0.22 | 15 | 0.22 | 1:1 | 30 | 270 | Excellent fluidization |
| 2A | Iron oxide powder | 0.5 | 2.3 | — | — | 0 | 12–30 | <10 | Little fluidization |
| 2B | Iron oxide powder | 0.5 | 2.3 | 15 | 0.22 | 22:78 | 12 | 33 | Fair fluidization |
| 2C | Iron oxide powder | 0.5 | 2.3 | 15 | 0.22 | 22:78 | 20 | 42 | Fair fluidization |
| 2D | Iron oxide powder | 0.5 | 2.3 | 15 | 0.22 | 22:78 | 30 | 50 | Fair fluidization |
| 2E | Iron oxide powder | 0.5 | 2.3 | 15 | 0.22 | 1:1 | 12 | 21 | Fair fluidization |
| 2F | Iron oxide powder | 0.5 | 2.3 | 15 | 0.22 | 1:1 | 20 | 24 | Fair fluidization |
| 2G | Iron oxide powder | 0.5 | 2.3 | 15 | 0.22 | 1:1 | 30 | 45 | Fair fluidization |
| 2H | Iron oxide powder | 0.5 | 2.3 | 15 | 0.22 | 4:1 | 12 | 56 | Good fluidization |
| 2I | Iron oxide powder | 0.5 | 2.3 | 15 | 0.22 | 4:1 | 20 | 75 | Good fluidization |
| 2J | Iron oxide powder | 0.5 | 2.3 | 15 | 0.22 | 4:1 | 30 | 110 | Good fluidization |
| 3A | Angular alumina | 9 | 1.2 | — | — | 0 | 12–30 | <10 | Poor fluidization |
| 3B | Angular alumina | 9 | 1.2 | 15 | 0.22 | 16:84 | 12 | 48 | Good fluidization |
| 3C | Angular alumina | 9 | 1.2 | 15 | 0.22 | 16:84 | 20 | 73 | Good fluidization |
| 3D | Angular alumina | 9 | 1.2 | 15 | 0.22 | 16:84 | 30 | 95 | Good fluidization |

EXAMPLE 2

This Example also demonstrates the effectiveness of tendrillar carbonaceous material as a fluidization aid for a cohesive powder. The same vessel was used as used for Example 1. The results of Example 2 are also presented in Table 1. The cohesive powder used was iron oxide powder. Without tendrillar carbonaceous material (Example 2A) some solids motion near the top of the bed in a superficial gas velocity range of 12 to 30 cm/s was achieved, but there was less than 10% bed expansion. Most of the iron oxide powder did not fluidize.

An attempt was made to combine the iron oxide powder with tendrillar carbonaceous material using the same wet technique as used in Example 1, but the mixture was found to have poor uniformity and was not tested. Mixtures having tendrillar carbon to iron oxide mass ratios of 22:78 (Examples 2B–2D), 1:1 (Examples 2E–2G), and 4:1 (Examples 2H–2J) were prepared by putting the solids into a ceramic jar and tumbling the solids by rolling the jar for several hours. Mixtures having carbon to iron oxide mass ratios of 22:78 and 1:1 had fair fluidization, without significant bubbling, but with sluggish solids movement. By increasing the carbon to iron mass ratio to 4:1, more rapid solids mixing was achieved and bubbling was absent.

EXAMPLE 3

This example demonstrates how the use of tendrillar carbonaceous material as a fluidization aid allows good fluidization of a cohesive powder that otherwise has poor fluidization characteristics. The cohesive powder used was angular alumina. Testing was performed in the same unit used for Example 1. The properties of the angular alumina, tendrillar carbonaceous material properties, mass ratios, gas velocities, and test results are presented in Table 1. The angular alumina by itself (Example 3A) fluidized poorly for awhile, and then fell out of fluidization with stable channels forming in the bed. Mixtures of angular alumina and tendrillar carbonaceous material (Examples 3B-3D) were prepared by mixing the two materials in a plastic jar and manually shaking the jar for about one minute. The fluidization quality of the mixtures was good with no apparent bubbling and good solids mixing.

EXAMPLE 4

This Example demonstrates the effectiveness of tendrillar carbonaceous material in reducing the entrainment of a Group C material. The particulate material tested was 900 grit alumina which is the same material tested in Example 3. The properties of the particulate material and tendrillar carbonaceous material used, mass ratios used, gas velocity, particulate material entrainment, and tendrillar carbonaceous material entrainment are presented in Table 2. The test unit was a plastic 10 cm diameter vertical chamber with a height of 12 meters. With the 900 grit alumina, use of the tendrillar carbonaceous material resulted in a very substantial decrease in entrainment of the alumina over a wide range of mixture ratios.

terial at a sufficient velocity to fluidize the cohesive material and the tendrillar carbonaceous material.

2. The method of claim 1 in which the tendrils have a diameter of from about 0.1 to about 0.3 microns and a length to diameter ratio of from about 5:1 to about 50:1.

3. The method of claim 1 in which the tendrillar carbonaceous material has a mean particle size of from about 5 to about 50 microns.

4. The method of claim 1 in which the tendrils comprise carbon fibers and a ferrous group metal component dispersed throughout the carbon fibers as nodules that are intimately associated with and at least partially bonded to the carbon fibers, and wherein the tendrillar carbonaceous material comprises from 0.1 to 60% by weight ferrous metal, from 40 to 99.9% by weight carbon, and up to 1.5% by weight hydrogen.

5. The method of claim 1 in which the cohesive material is a Geldart C material.

6. The method of claim 1 including the additional step of heating the cohesive material.

7. The method of claim 1 in which the mean particle size of the tendrillar carbonaceous material is greater than the mean particle size of the cohesive material.

8. The method of claim 1 in which the bulk density of the tendrillar carbonaceous material is greater than the bulk density of the cohesive material.

9. The method of claim 1 in which the tendrillar

TABLE 2

| | Particulate Material | | | Fluidization Aid | | | | Gas | | |
|---|---|---|---|---|---|---|---|---|---|---|
| Example | Type | Mean Diameter (Micron) | Bulk Density (g/cm$^3$) | Type | Mean Diameter (Micron) | Bulk Density (g/cm$^3$) | Mass Ratio (Fluidizer: Particulate) | Velocity (cm/s) | Particulate Entrainment[1] (g/cm$^2$s) × 10$^4$ | Fluidization Aid Entrainment[1] (g/cm$^2$s) × 10$^4$ |
| 4A | 900 grit alumina | 9 | 1.2 | — | — | — | 0 | 40 | 3.8 | — |
| 4B | 900 grit alumina | 9 | 1.2 | TCM[2] | 15 | 0.35 | 1:20 | 40 | 1.3 | 0.34 |
| 4C | 900 grit alumina | 9 | 1.2 | TCM[2] | 15 | 0.35 | 1:5 | 40 | 1.0 | 1.0 |

[1] $\frac{M}{A \cdot T}$ where M = mass entrained (g)
A = cross sectional area of reactor (cm$^2$)
T = time (seconds)
[2] Tendrillar Carbonaceous Material — 96% C Thus, tendrillar carbonaceous material is an effective fluidization aid. It can be used to fluidize cohesive materials without significant carryover rates at high gas velocities without bubbling.

Although the present invention has been described in considerable detail with reference to certain preferred versions thereof, other versions are possible. For example, the fluidized bed can contain particulate solids of varying particle sizes and densities. Therefore, the spirit and scope of the appended claims should not be limited to the description of the preferred versions contained herein.

What is claimed is:

1. A method for fluidizing a cohesive material in a mixed fluidized bed, the cohesive material having a mean particle size of from about 0.1 to about 120 microns and a particle density of from 0.1 to 4 g/cm$^3$, the method comprising the steps of:
   (a) combining the cohesive material with tendrillar carbonaceous material in a mass ratio of tendrillar carbonaceous material to cohesive material of from about 1:9 to about 4:1, the tendrillar carbonaceous material having a bulk density of from about 0.04 to about 0.7 g/cm$^3$ and comprising an agglomeration of tendrils having a diameter of from about 0.01 to about 1 micron and a length to diameter ratio of from about 5:1 to about 1000:1; and
   (b) passing a fluidizing gas through the combined cohesive material and tendrillar carbonaceous macarbonaceous material has a composition different from the composition of the cohesive material.

10. A composition suitable for fluidization in a mixed fluidized bed comprising:
   (a) a cohesive material having a mean particle size of from 0.1 to 120 microns and a particle density of from 0.1 to 4 g/cm$^3$; and
   (b) tendrillar carbonaceous material having a bulk density of from about 0.04 to about 0.7 g/cm$^3$ and comprising an agglomeration of tendrils having a diameter of from about 0.01 to about 1 micron and a length to diameter ratio of from about 5:1 to about 1000:1.

11. The composition of claim 10 in which the tendrils have a diameter of from about 0.1 to about 0.3 microns and a length to diameter ratio of from about 5:1 to about 50:1.

12. The composition of claim 10 in which the tendrillar carbonaceous material has a mean particle size of from about 5 to about 50 microns.

13. The composition of claim 10 in which the tendrils comprise carbon fibers and a ferrous group metal component dispersed throughout the carbon fibers as nodules that are intimately associated with and at least partially bonded to the carbon fibers, and wherein the tendrillar carbonaceous material comprises from 0.1 to 60% by weight ferrous metal, from 40 to 99.9% by weight carbon, and up to 1.5% by weight hydrogen.

14. The composition of claim 10 in which the cohesive material is a Geldart C material.

15. The composition of claim 10 wherein the particle size of the tendrillar carbonaceous material is greater than the particle size of the cohesive material.

16. The composition of claim 10 wherein the bulk density of the tendrillar carbonaceous material is greater than the bulk density of the cohesive material.

17. The composition of claim 10 wherein the tendrillar carbonaceous material has a composition different from the composition of the cohesive material.

* * * * *